United States Patent

[11] 3,533,424

| [72] | Inventor | William W. Wedge<br>Fairfield, Connecticut |
|---|---|---|
| [21] | Appl. No. | 659,433 |
| [22] | Filed | Aug. 9, 1967 |
| [45] | Patented | Oct. 13, 1970 |
| [73] | Assignee | Wedge, Incorporated<br>Bridgeport, Connecticut<br>a corporation of Connecticut |

[54] PIPE CONNECTOR MACHINE
5 Claims, 7 Drawing Figs.

[52] U.S. Cl. .................................................. 137/15,
137/318, 251/146
[51] Int. Cl. .................................................. F16l 55/18
[50] Field of Search .......................................... 137/15,
315, 318; 251/145, 146

[56] References Cited
UNITED STATES PATENTS

| 314,085 | 3/1885 | Norman | 137/318X |
| 2,414,911 | 1/1947 | Temple | 137/318X |
| 2,566,502 | 9/1951 | Smith | 137/15 |
| 2,964,290 | 12/1960 | Mueller | 137/318X |
| 3,104,456 | 9/1963 | Powell | 137/318X |
| 3,272,033 | 9/1966 | Leopold et al. | 137/318X |

Primary Examiner—William F. O'Dea
Assistant Examiner—David R. Matthews
Attorney—Smythe and Moore ABSTRACT: A fixture for removing a removable plug from a tapping nipple having one end inserted into a hole in a supply main. A valve is then mounted on the other end of the nipple in conjunction with the tapping of a supply main without the escape of fluid therefrom. The fixture has a rod extending through the valve, ball or gate valve, to unscrew the plug and withdraw the plug through the open valve, the valve being closed after the plug is withdrawn. Also, the invention includes connecting a service pipe to a water main wherein a removable plug in a nipple is removed and withdrawn through a valve, such as a gate valve, mounted on the other end of the nipple.

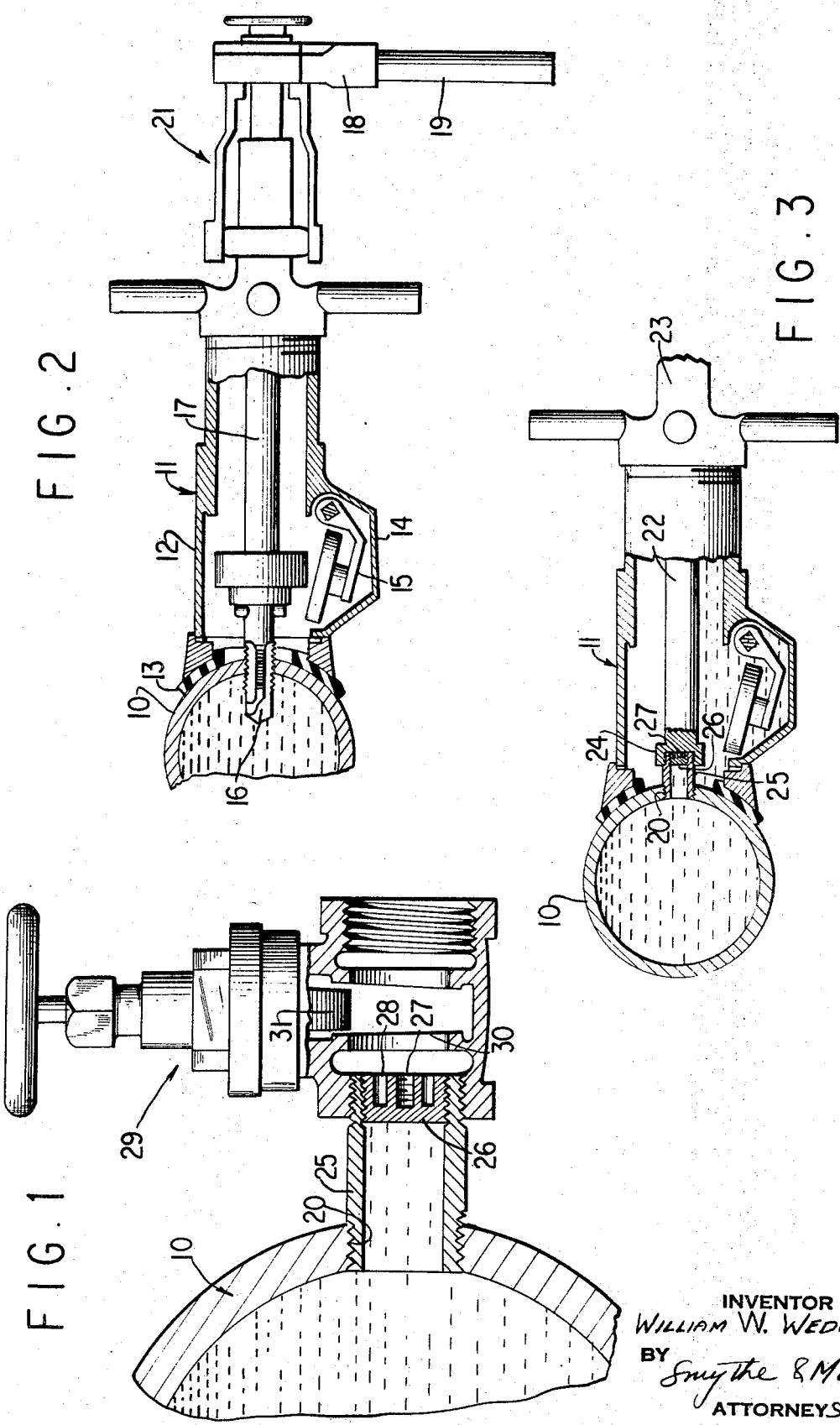

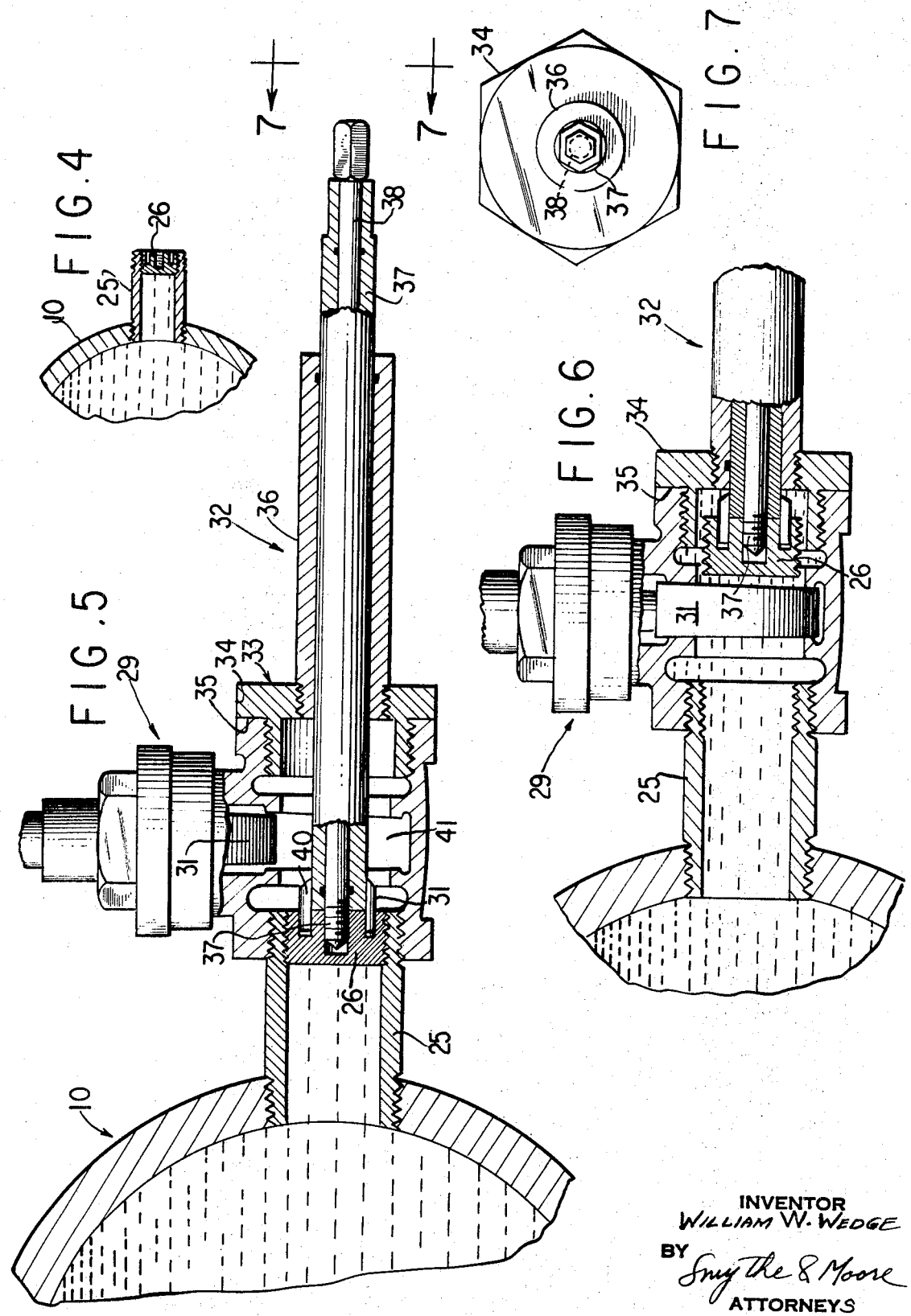

PIPE CONNECTOR MACHINE

The present invention relates to the tapping of a pipe under pressure for connection of a pipe thereto without the escape of fluid and more particularly to an apparatus and method for tapping a pipe under pressure for the connection of a valve or other connection thereto.

In attaching lateral or service connections to a fluid conduit, such as a water or fuel main, while the main remains in operation, a hole is generally tapped into the wall of the main and a suitable fitting or connection is inserted in the hole. Many forms of drilling and tapping machines have been devised for the tapping of such a hole in a water or similar main so that a suitable connection may be inserted in the hole. The mounting of such a connection is generally accompanied by an escape of considerable quantity of fluid from the main. In addition, the apparatus for accomplishing this operation is heavy and cumbersome so that considerable time is required for making each service connection. The apparatus generally comprises a housing which is mounted or secured to the exterior of the main. A combination drill and tap is then introduced through the housing to bore and to tap a hole in the main. Some form of a check or flap valve is usually provided within the housing to prevent the escape of fluid from the main after the hole has been tapped therein. Previously known methods and apparatus for mounting a connection or fitting into the tap holes have not been completely satisfactory since the procedure for making this connection was quite involved and time-consuming. Also, the housings required were large and cumbersome in order to surround the valve to be placed on the connection.

It is an object of the present invention to provide an improved apparatus and method for tapping a main without the loss of fluid therefrom and without employing large and cumbersome apparatus.

Another object of the invention is to provide an apparatus for removing and withdrawing a plug from a nipple inserted into a tap hole in the main in such a manner that substantially no fluid escapes therefrom.

A further object of the invention is to provide a method of attaching a connection or fitting to a main while the main remains in service without the loss of fluid therefrom.

In practicing the invention, a drilling and tapping device is usually mounted on the water main and a hole is tapped into the main. One end of a nipple with a removable plug threaded into one end is then inserted into the tapped hole. The drilling and tapping housing then can be removed. The outer face of said plug may be provided with a centrally positioned tapped bore and recesses. The valve then is screwed onto the nipple. A fixture having a tubular housing is inserted into the other end of the valve with the tubular housing being provided with an external flange engaging the valve end. A sleeve extends outwardly from the tubular housing of the fixture and a rotatable and axially movable rod is carried within the sleeve. The sleeve extends into engagement with the removable plug and has a threaded inner end for engagement with the threaded bore of the plug. The inner end of the rod may also comprise axially extending nibs engageable with the aforementioned recesses in the plug.

The valve is fully opened and the rod means of the fixture lockingly engaged with the plug. Rotation of the rod means will remove the plug from the nipple and withdrawal of the rod means will withdraw the plug from the nipple through the open valve. As the plug is withdrawn through the open valve, the valve is closed to prevent the escape of fluid from the main.

Other objects, advantages and features of the invention will become apparent from the accompanying description and drawings, which are merely exemplary.

In the drawings:

FIG. 1 is a sectional view showing a gate valve mounted on a nipple inserted into a water main;

FIG. 2 is a partial sectional view showing one form of a drilling and tapping machine for the water main;

FIG. 3 is a sectional view illustrating the insertion of a nipple into a hole tapped in the main, the nipple having a removable plug;

FIG. 4 is an enlarged sectional view of the nipple and plug in the tapped hole in the main after the drilling and tapping machine has been removed from the main;

FIG. 5 is a sectional view showing the fixture according to the invention mounted on the gate valve;

FIG. 6 is a view similar to FIG. 5 but showing the valve in the closed position after the plug has been removed; and FIG. 7 is an end view of the fixture of FIG. 5, looking in the direction of the line 7-7.

Referring to the drawings wherein like reference symbols indicate the same parts throughout the various views, a specific embodiment of the invention will be described in detail.

As may be seen in FIG. 2, a water main to which a service connection is to be made is indicated at 10. A drilling and tapping machine, generally indicated at 11 (FIG. 2), is mounted on main 10. The drilling and tapping machine illustrated in the drawings is conventional and is representative of such machines generally used in this operation. The machine comprises a housing 12 which is positioned on the outer surface of main 10 on top of a saddle gasket 13 and is held thereon by suitable means such as a chain (not shown). One example is illustrated in U.S. Pat. No. 2,745,669.

The housing 12 has an enlargement 14 in which is pivotally mounted a flap valve 15. Combined drill and tap 16 is mounted on the end of a boring bar 17, the outer end of which is received in a complementary socket or opening of a ratchet wrench 18 having a detachable operating handle 19. The ratchet wrench is used to rotate the boring bar 17 by hand although it is to be understood that an electric or air power operator also may be employed to rotate the boring bar.

After the main 10 has been drilled and tapped to form a tap opening 20 (FIG. 3), a yoke 21 of the drilling and tapping machine is removed and the ratchet pawl on wrench 18 is reversed so that reverse operation of the wrench will unthread the tool 16 from the tapped opening. The boring bar 17 is then removed from the machine and rod 22 inserted into the top portion 23 of the drilling and tapping machine into the position shown in FIG. 3. The rod 22 has a cup-shaped member 24 at its inner end into which is threaded one end of a nipple 25 having a removable plug 26 therein. The plug 26 is threaded into the outer end of the nipple 25 and is provided on its outer face with a threaded bore 27 and sockets or recesses 28. The nipple 25 is then screwed into the tap opening 20. The rod 22 is then unscrewed from the nipple 25. Since the normal nipple has a tapered thread, the connection between main 10 and the nipple 25 is sufficiently tight so that the rod 22 can be rotated and released from the end of nipple 25.

After the nipple with its removable plug is threaded into the tap opening, gate valve 29 is threaded onto the outer end of the nipple 25. The valve is of the type which has an opening 30 therethrough which is full size when valve member 31 is retracted to the fully opened position, the fully opened position being shown in FIG. 1. Other types of valves can be used.

A fixture, indicated generally at 32, is mounted on the other or outer end of gate valve 29. Fixture 32 comprises a tubular housing 33 which is threadedly mounted onto the gate valve 29 and is provided with an external flange 34 which engages the outer end of the gate valve at 35. The fixture is further provided with a sleeve 36 in which is rotatably and axially movably mounted plug removal rod 37. A second locking rod 38 is provided within rod 37 and has threads 39 corresponding to the threads in the bored recess 27 of the removable plug. The end of rod 37 is also provided with a pair of axially extending nibs 40 which are insertable in recesses 28 of the removable plug for use in unscrewing the plug from the nipple.

In the process of tapping a water main according to the present invention, a hole is first tapped in the main with the drilling and tapping machine as shown in FIG. 2. A tubular connector in the form of a nipple threaded at both ends and having a removable plug therein is screwed into the tapped hole as illustrated in FIG. 3. A gate valve or similar type is then threaded onto the end of the nipple as shown in FIG. 1.

A fixture 32 is then threaded on the other end of the gate valve and the locking rod of the fixture rotated into threaded engagement with the threaded recess on the removable plug. The plug is then unscrewed from the nipple and withdrawn through the gate valve below the open valve member 31 and through the valve chamber 41.

Immediately upon withdrawal of the plug past the valve chamber into the position shown in FIG. 6, the valve member 31 is lowered to its closed position. As a result, water main 10 is now provided with a connection having a fitting in the form of a closed gate valve.

It is to be noted that the plug is withdrawn into the tubular housing 33 of the fixture as also shown in FIG. 6. The fixture is not removed from the gate valve until after the valve has been closed. In this manner, there will be no leakage of water through the connection.

Thus, it can be seen that the present invention provides an apparatus and method for the tapping of a water or gas main without any disruption of service and with the use of relatively small devices. By employing the fixture according to the present invention, a minimum of space is required and the resultant connection is a nipple and a valve. Service lines can thus be attached directly to the valve, thereby significantly reducing the time required in making a service connection to a main.

It is to be understood that changes can be made in various details of construction and arrangement of parts without departing from the spirit of the invention, except as defined in the appended claims.

I claim:

1. A fixture for removing a closure plug from the upper end of a tapping nipple having its other end threadedly inserted into a hole in a supply main under pressure, a valve removably and threadedly mounted on the upper end of said nipple, a closeable passage in said valve spaced from and generally in alignment with said plug, elongated rod means alignable with said valve passage and plug and extendable through said valve passage and connectingly engageable with said plug when said valve passage is open to permit the removal and withdrawal of said plug into the upper end of said valve, and means for closing said valve passage after said plug has been removed therethrough and below said plug to prevent the escape of fluid from said main and valve whereby a service pipe may be generally aligned with and connected to the uppermost portion of said valve to permit controllable flow from said main through said valve and service pipe.

2. In a fixture according to claim 1 wherein the valve connectable to said nipple has a threaded extension on the uppermost portion thereof, an elongated tubular sleeve connected to said extension, and said rod means is received within and extends through said sleeve and valve passage for connection to said closure plug.

3. In a fixture according to claim 1 wherein said plug is interiorly threaded, said elongated rod is tubular and a locking rod is sleeved within and extends through said elongated rod, and the inner end of said locking rod being threaded for engagement with the interior threads of said plug.

4. In a fixture according to claim 2 wherein recesses are formed in the outer face of said plug, and the inner end of said elongated rod having projections thereon engageable with said recesses for aligning said rod and plug.

5. In a method of connecting a service pipe to a fluid main under pressure without the escape of fluid, the steps comprising clamping a tapping apparatus to the exterior of a fluid main, drilling and tapping a hole in the enclosed portion of the fluid main within said apparatus, removing a portion of the tapping apparatus and inserting a tapping nipple having a removable closure plug into the hole, removing the remainder of said tapping apparatus, mounting a valve on the end of said nipple and closing the same, attaching a tubular extension to said valve, opening said valve, inserting a rod through said tubular extension and said open valve and connecting the end thereof to said closure plug, rotating said rod and plug to disconnect it from said nipple and withdrawing the plug through the open valve, closing the valve, removing said tubular extension, rod and plug from said valve, and attaching a service pipe to said valve.

UNITED STATES PATENT OFFICE
CERTIFICATE OF CORRECTION

Patent No. 3,533,424                         Dated October 13, 1970

Inventor(s) William W. Wedge

It is certified that error appears in the above-identified patent and that said Letters Patent are hereby corrected as shown below:

Column 2, line 23, insert "Such often is referred to as a saddle clamp device." after the period(.).

JAN. 19, 1971

(SEAL)
Attest:

Edward M. Fletcher, Jr.
Attesting Officer

WILLIAM E. SCHUYLER, JR.
Commissioner of Patents